Dec. 5, 1961 J. O'HARA BLACK 3,011,312
PROPULSION SYSTEM
Filed Dec. 21, 1959 2 Sheets-Sheet 2

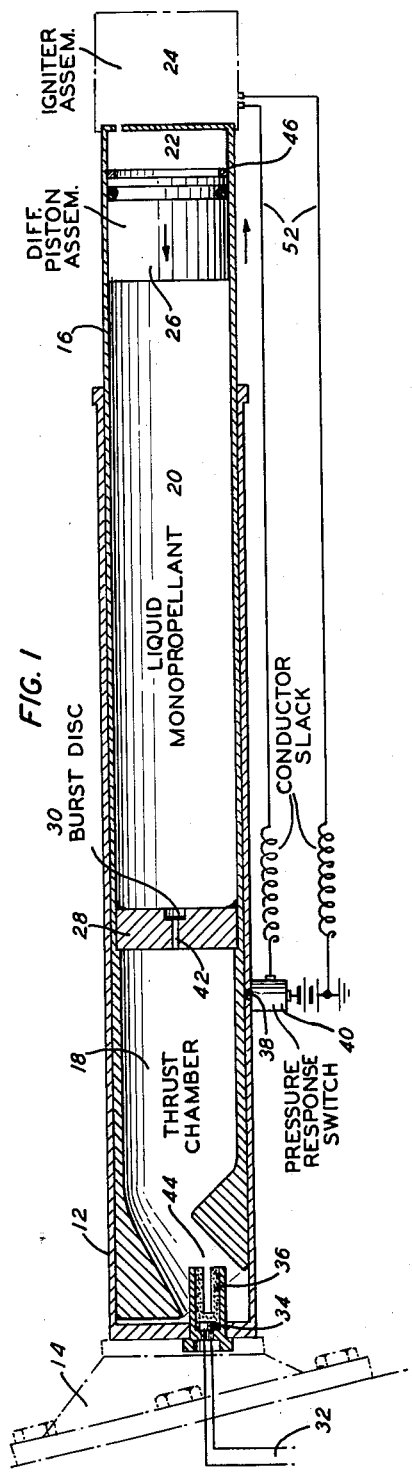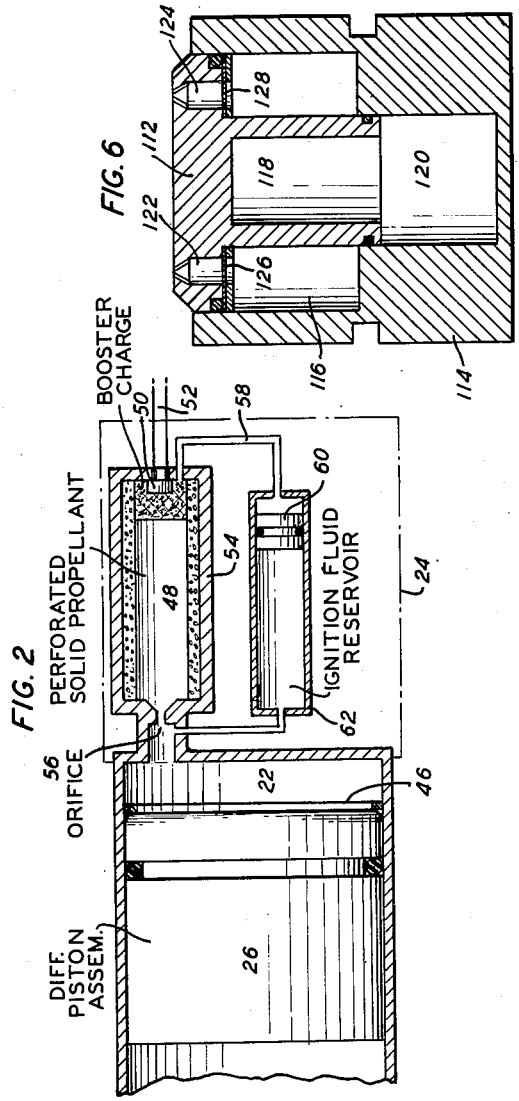

INVENTOR
JOHN O. BLACK
BY
Alan C. Rose
ATTORNEY

United States Patent Office 3,011,312
Patented Dec. 5, 1961

3,011,312
PROPULSION SYSTEM
John O'Hara Black, Denville, N.J., assignor, by mesne assignments, to Hydro-Space Technology Incorporated, Wilmington, Del., a corporation of Delaware
Filed Dec. 21, 1959, Ser. No. 860,795
12 Claims. (Cl. 60—39.48)

This invention relates to arrangements for forcing the flow of liquid from a tank, and more particularly to a piston type structure for the pressurization of the liquid monopropellant employed with a suitable thrust chamber.

In the field of liquid propellant rockets, considerable difficulty has been encountered in the feeding or pumping of the propellant to the rocket engine. In particular, the arrangements which have been proposed up to the present time have generally been unnecessarily complex and expensive, or else have not been sufficiently reliable.

Accordingly, a principal object of the present invention is the simplification and reduction in cost of liquid pressurization systems, while maintaining high reliability.

The foregoing object is achieved, in accordance with the present invention, by the use of differential area piston assembly to provide self-pressurization in a liquid monopropellant rocket. Pressurization is obtained from the combustion of a small quantity of the propellant. The monopropellant is injected through a spray nozzle or impinging stream type injector into the combustion volume above the piston by the action of the differential piston assembly. The piston assembly as a whole is then forced down against the main body of the liquid propellant, supplying the necessary pressurization to force the liquid propellant into the thrust chamber.

In one illustrative embodiment of the invention, the differential piston assembly itself includes inner and outer pistons slidable within each other, and an inner cavity of relatively small diameter for holding a quantity of propellant. The inner piston has one end slidable in the inner cavity and its other end slidable in an enlarged portion of the outer piston. As explained in detail below, this arrangement produces a higher pressure in the cavity within the differential piston assembly than in the combustion volume above the assembly; propellant from the inner cavity is therefore sprayed through the connecting nozzle into the combustion volume. This action is initiated by the ignition of a charge which also ignites the propellant which is sprayed into the pressurization combustion volume.

In accordance with a feature of the invention, propellant may be supplied from a fuel tank to a thrust chamber by a differential piston assembly slidable in the fuel tank. Furthermore, this differential piston assembly includes two pistons slidable within each other and enclosing at least one cavity having a given cross sectional area, the inner of the two pistons being slidably mounted in the inner cavity and having an exposed area which is greater than the cross sectional area of the inner cavity.

The differential piston assembly may contain a monopropellant in a single inner chamber, or may contain a fuel and an oxidizer in separate inner chambers. In either case the ignition may be hypergolic, or may be effected by a suitable solid propellant charge.

The principal advantages of the invention are the simplicity and reliability of the apparatus. Only two simple pistons are required, as contrasted with the complex fuel pumping systems which have been proposed heretofore. Furthermore, the use of a small amount of the same propellant which is to power the rocket greatly simplifies the problem of supplying power to the liquid feeding device.

Other objects, features and advantages of the present invention will become apparent from a consideration of the following detailed description, from the claims, and from the drawings, in which:

FIG. 1 shows an assembly in accordance with the invention showing how the differential piston apparatus may be used in an ejection seat rocket system;

FIG. 2 shows the details of the starting arrangements for one embodiment of the invention;

FIG. 6 represents an alternative form of differential piston assembly.

Figure 4:
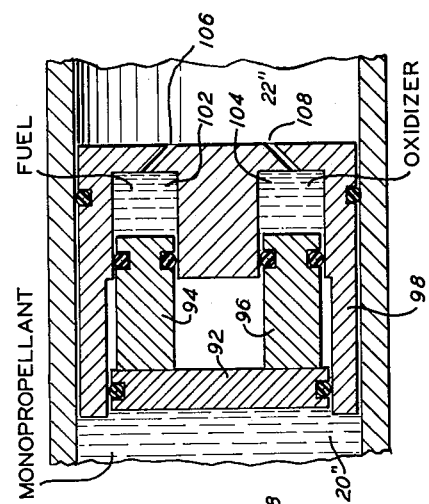
FIG. 4 is a drawing of an arrangement in which the differential piston is actuated by a propellant formed by the combination of separately stored fuel and oxidizer.

Referring in detail to the drawings, FIG. 1 shows a differential piston assembly employed in a rocket which is applicable to the powering of ejection seats for escape from high speed and/or low flying aircraft. In FIG. 1, an outer catapult tube 12 is fixed in position, and may for example be secured to the frame of an airplane by a bracket 14 shown in dash-dot lines. The inner catapult tube 16 comprises the rocket assembly and attached pilot seat (not shown) secured to it, and moves out of the outer catapult tube 12 when the propellants within the tubes are ignited. The rocket assembly acts as a piston while it is within the outer tube. This action is caused by the combustion of a propellant other than that pressurized by the differential piston. Burning of the liquid propellant takes place after separation of the inner and outer catapult tubes.

The movable inner catapult tube has four principal portions. These include the thrust chamber 18, the liquid monopropellant chamber 20, the fuel feeding pressurization chamber 22, and the igniter assembly 24. The injector 42 and exhaust nozzle 44 are also important for rocket operation.

The differential piston assembly 26 is located between the propellant tank 20 and the pressurization chamber 22. As explained in detail below, the differential piston assembly 26 is moved to the left in FIG. 1 to force fuel into the thrust chamber 18 when the system is in operation. The injector plate 28 separates the thrust chamber 18 from the liquid monopropellant tank 20. A burst disc 30 blocks the flow of propellant into the thrust chamber 18 up to the time of adequate pressure build up in the pressurization chamber 22.

To initiate the ejection sequence, the pilot energizes the circuit 32 to the igniter squib 34. A mechanical fusing pin may be used in place of the electrical system shown. This action ignites the solid propellant charge 36, and the build up of pressure in the space above this cartridge unit starts the separation of the inner tube 16 from the outer catapult tube 12. Additional solid propellant charges may also be provided to be ignited progressively as the two catapult tubes separate to obtain improved pressure programming. The details of such an arrangement are disclosed in a patent application of David Fulton, entitled "Propulsion System," which was filed concurrently with this specification.

After the inner tube 16 has moved to the right, a sufficient distance to unport the aperture 38 in the outer tube 12, the pressure responsive switch 40 is energized. This serves to apply a current impulse to the igniter assembly 24, and initiate the build up of pressure in the chamber 22. An alternate arrangement for proper timing of the firing of the rocket motor can be obtained by the use of a lanyard of the proper length attached to the outer tube assembly actuating a mechanical firing device in the igniter assembly. The differential piston assembly 26 then starts moving to the left in FIG. 1, rupturing the burst disc 30 and forcing liquid monopropellant through the injector 42 into the thrust chamber 18. The monopropellant is ignited either by the hot gases in the chamber 18 or by a separate igniter assembly located in the thrust chamber, and rocket action is initiated.

It is noted in passing that the nozzle 44 is canted with respect to the axis of the catapult tubes. This arrangement is desirable so that the thrust of the rocket will pass through the approximate center of gravity of the ejection seat (not shown) which would be secured to one side of the inner catapult tube 16 at its right hand end shown in FIG. 1. For the purposes of the present invention, which is principally concerned with the differential piston assembly, the form of the rocket thrust chamber is not critical. It may also be noted that a stop ring 46 is secured to the inner tube 16 to the right of the differential piston assembly 26 to prevent movement of this assembly to the right. With this arrangement, any build up of pressure across the burst disc 30 due to ignition of the charge 36 is insufficient to rupture it. A simple one-way valve may also be added to the assembly of FIG. 1 to block flow through injector 42 from the thrust chamber 18, but to permit propellant flow into the thrust chamber.

With reference to FIG. 2, the igniter assembly which initiates combustion in the presurization chamber 22 is shown in some detail. As disclosed below, when pressure is applied to the differential piston assembly 26, monopropellant is ejected from the assembly and sprayed into the pressurization chamber 22. The perforated solid propellant grain 48 is ignited by the squib 50 when an electrical impulse is applied to the wires 52 as shown or by a mechanical actuated firing pin. As pressure builds up within the housing 54, gases forced through the orifice 56 increase the pressure in chamber 22, thus starting the flow of monopropellant from the piston assembly 26 into the chamber 22. Pressure is also applied through tube 58 to move the piston 60 in housing 62 and force ignition fluid into the chamber 22 in applications where such accessory device is preferred. Hypergolic ignition in the chamber 22 occurs when, for example, the monopropellant contains nitric acid and the ignition fluid is unsymmetrical dimethyl hydrazine. It has also been discovered that ignition may be effected by the solid propellant charge itself, without the special ignition fluid for causing hypergolic ignition.

Figure 3:
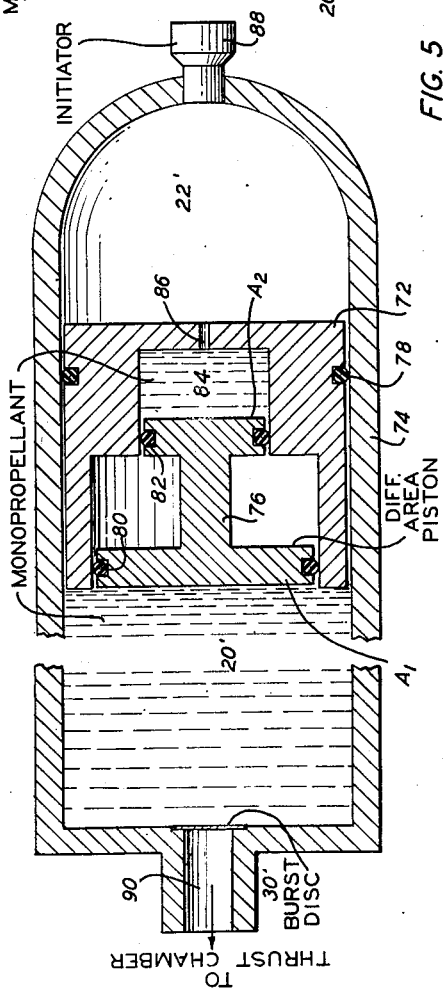
FIG. 3 represents a differential piston assembly employing a monopropellant.

FIG. 3 shows one form of differential piston in accordance with the present invention. In FIG. 3, the differential piston assembly includes the outer piston 72 which slides wtihin the fuel tank 74, and the inner piston 76 which slides within the outer piston 72. The liquid monopropellant in 20′ and 84 is blocked from flowing past the pistons 72 and 76 by suitable sealing arrangements such as the O-rings 78, 80, and 82. Within the differential piston assembly is a small chamber 84 which is initially filled wtih a small quantity of liquid monopropellant; the quantity required is determined by the requirements of the particular rocket motor. The small monopropellant chamber 84 communicates with the pressurization chamber 22′ via an injector orifice 86.

When the initiator or igniter assembly 88 is fired, pressure starts to build up across the pistons 72 and 76 which make up the differential piston assembly. As a result of the greater area $A_1$ of the left hand end of piston 76 which is exposed to the monopropellant chamber 20′ as contrasted with the smaller area $A_2$ of the right hand end of piston 76, the monopropellant in the small chamber 84 is subjected to higher pressure than the resulting hot gases in chamber 22′. The pressure drop across the injector 86 is determined by the following formula:

$$P_{84} - P = \frac{P(A_1 - A_2)}{A_2}$$

where P is the tank pressure which is substantially equal on both sides of the piston assembly, $P_{84}$ is the pressure of the inner monopropellant chamber 84, and $A_1$ and $A_2$ are the areas of the two ends of the piston 76.

As a result of the pressure developed across the injector 86, monopropellant is sprayed into the right hand pressurization chamber 22′. As combustion takes place in chamber 22′, the pressure applied through the differential piston assembly to the monopropellant in the chamber 20′ increases so that the burst disc 30′ ruptures. The steady state pressure level attained is strictly governed by the differential piston and rocket design parameters. Following the rupture of burst disc 30′, the differential assembly moves to the left in the embodiment shown in FIG. 3, forcing the monopropellant in the main tank 20′ through the large injector 90 into the thrust chamber of the rocket. This action continues until the monopropellant in the small tank 84 is expended or until the assembly reaches the end of the fuel tank.

Figure 5:
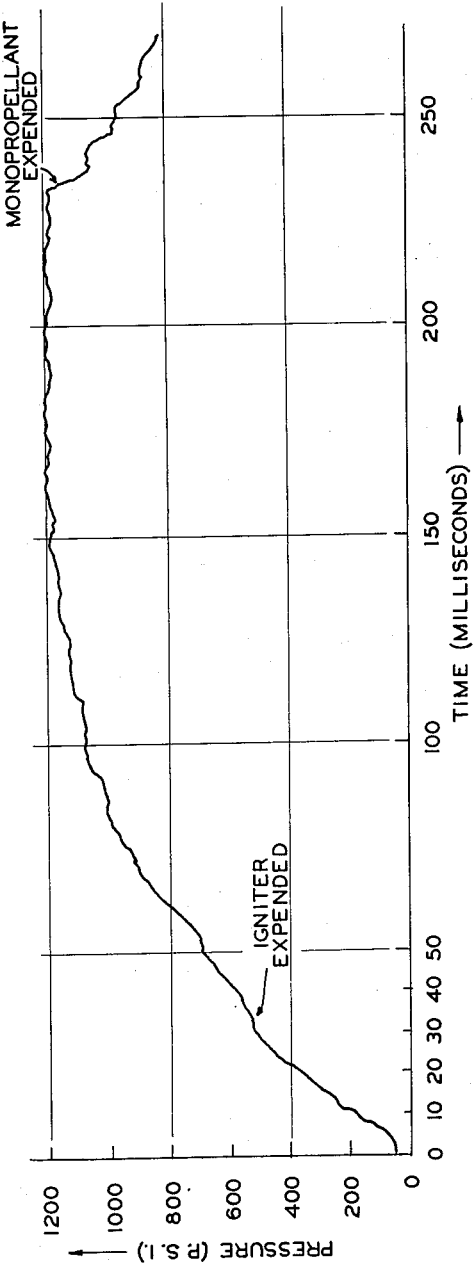
FIG. 5 is a typical plot of pressure against time for a differential piston assembly powered by a monopropellant.

The plot of FIG. 5, which was obtained experimentally, shows pressure versus time for a monopropellant differential piston assembly such as that shown in FIG. 3. Note that the pressure rose rapidly and then levelled off at a pressure of close to 1200 pounds per square inch. This terminal pressure may be varied simply by changing the size of the injector orifice 86 shown in FIG. 3. In addition, of course, the larger the diameter of the injector orifice 90, the lower the maximum pressure. The legends on the plot of FIG. 5 indicate the points in the cycle at which the initiating charge and the propellant are expended.

FIG. 4 shows an embodiment of the invention in which the pressure in the pressurization chamber 22″ is provided by combustion of a propellant including a fuel and an oxidizer. In the case of the arrangement of FIG. 4, the inner piston 92 has two cylindrical extensions 94 and 96 which extend into corresponding openings or chambers 102 and 104 in the outer piston 98. The chamber 102 contains fuel, and the chamber 104 contains oxidizer. By way of example, the oxidizer may be nitric acid and the fuel may be unsymmetrical dimethyl hydrazine. These particular components react hypergolically upon mixing and therefore do not require an igniter. As in the case of the embodiment of FIG. 3, initial pressurization of the chamber 22″ causes the flow of propellant into the chamber 22″. The injectors 106 and 108 interconnect the two chambers in the differentital piston assembly and the pressurization chamber 22″. To avoid premature ignition, a burst disc or some other simple low pressure and low temperature sealing means may be employed to initially close the openings 106 and 108. Suitable O-ring sealing means are employed in the structure of FIG. 4 as in the arrangement of FIG. 3.

FIG. 6 shows another form of differential piston assembly, which is for a monopropellant system and which is similar to the arrangement of FIG. 3. In FIG. 6, an inner piston 112 is slidably mounted within the outer piston 114. Monopropellant is stored in the outer annular chamber 116. The recess 118 in piston 112 and the recess 120 in piston 114 form a deep air space, thus avoiding the build up of excessive back pressure as piston 112 slides into piston 114.

Several peripheral injectors 122, 124, are provided to inject monopropellant into the pressurization combustion chamber 22 as shown in FIG. 1. The burst discs 126 and 128 in the injectors 122 and 124, respectively, are designed to open at relatively low pressures, and thus permit flow of monopropellant into chamber 22 soon after the charge in the assembly 24 is ignited.

With regard to the propellants which may be used, any of a large number of known monopropellants or liquid bipropellants may be employed. The monopropellant may be an amine nitrate sale dissolved in nitric acid at a concentration of about 30 percent by weight of the salt. This corresponds to a ratio of reducing to oxidizing valences of between 1.1 and 1.2. In this case a ratio of 1.0 would be a stoichiometric ratio. The amine nitrates which have been successfully tested include di-isopropyl-amine nitrate, tetramethyl-ammonium nitrate, and N,N'-dimethyltriethylene-diammonium dinitrate. The differential piston for the bipropellant system as shown in FIG. 4 might employ, typically, unsymmetrical dimethyl hydrazine in the fuel chamber 102, and nitric acid in the oxidizer chamber 104. This combination is hypergolic and would therefore require an igniter only for producing the initial starting pressure. Other feasible bipropellant combinations include aniline-nitric acid, and turpentine-nitric acid, which are both hypergolic, and kerosene-nitric acid and ethanol-hydrogen peroxide, which would both require an ignition source. A squib, a sparkplug or a suitable catalyst may be employed to ignite the nonhypergolic propellants.

Concerning the geometry of the differential pistons, three alternative embodiments have been shown in FIGS. 3, 4 and 6. Other possibilities include (1) having the larger end of the inner differential piston slide directly on the fuel tank wall, (2) interchanging the air space and the propellant space in the illustrated embodiments, (3) inverting the piston assemblies with respect to the pressurization and monopropellant chambers, and (4) increasing the depth of the air chamber. In this regard, it may be noted that the arrangement of FIG. 6 essentially involves a modification of the arrangement of FIG. 3 by the modifications listed at (2), (3), and (4), above. In each case, the modifications must include injector openings from the propellant chamber or chambers to the pressurization combustion chamber. It may also be noted again that it is desirable to have the depth of the air chamber within the differential piston assembly somewhat greater than the depth of the propellant chamber or chambers, preferably as shown in FIG. 6. Under these conditions, back pressure developed upon reduction in volume of the air space is not significant. It may be noted that the arrangements of FIGS. 3 and 4 may be modified to increase the depth of the air space by drilling suitable holes into the pistons 72 and 98, respectively.

With regard to the orientation of the two pistons, they may be arranged either with the inner piston facing the main liquid monopropellant tank as in FIGS. 3 and 4, or with the inner piston facing the pressurization combustion chamber as shown in FIG. 6. When the inner piston faces the monopropellant, the advantage of automatic shutdown at the end of the piston stroke is obtained. On the other hand, when the inner piston is facing the pressurization chamber, there is no loss of pressure applied to the inner piston as a result of pressure drop across the piston assembly, and, for the arrangement of FIG. 1, all of the propellant in the main tank 20 is expelled by the flat front end of the outer piston.

In the foregoing description a number of advantages of the proposed differential piston arrangements have been developed. Certain specific advantages which may not have been explicitly set forth above will now be considered. The differential piston is very simple in design, highly reliable and economical in space utilization in comparison with conventional gas generator pressurization means. Also, the liquid monopropellant which is employed is inherently less sensitive to temperature variations than a solid propellant pressurization system. Additional advantages include ease of adaptation to diverse systems and arrangements and fast response following the initial ignition operation. Furthermore, when both the rocket and the differential piston are powered by the same liquid monopropellant, propellant logistics are greatly simplified.

It is to be understood that the above-described arrangements are illustrative of the principles of the invention. Numerous other arrangements may be devised by those skilled in the art without departing from the spirit and scope of the invention.

What is claimed is:

1. In combination, a thrust chamber having an ejection nozzle, a tank for containing liquid monopropellant, a main propellant injector interconnecting said tank and said chamber, pressure resposive means associated with said injector for controlling flow of propellant from said tank to said thrust chamber, a differential piston assembly located in said fuel tank on the other side of the monopropellant from said injector, said differential piston assembly including an outer open-ended piston slidable in said fuel tank and containing at least one inner cavity of a predetermined cross sectional area for liquid propellant and an inner piston having one end slidable in said cavity and the other end slidable in an enlarged portion of said outer open-ended piston, a secondary injector interconnecting said inner cavity and the space in said fuel tank away from said monopropellant, and means for supplying pressure to said last mentioned space and for igniting the propellant from said inner cavity as it is sprayed into said space.

2. A combination as defined in claim 1 wherein said inner piston has one end exposed to the monopropellant in said fuel tank.

3. A combination as defined in claim 1 wherein said inner piston has one end exposed to the space in said tank away from said monopropellant.

4. In combination, a tube having a closed end, a differential piston assembly slidably mounted within said tube for axial movement therein for forcing by piston action a liquid within said tube toward the other end thereof, said assembly including two relatively movable interfitting piston members forming a propellant space including at least one chamber, the cross sectional area of said chamber being less than the area of either of said piston members exposed to the space within said tube, liquid propellant in said chamber, an injector orifice extending from said chamber to the space between said assembly and the closed end of said tube, and means for igniting said propellant in the space between said assembly and the end of said tube to move the piston within said tube to force liquid therein toward the other end of the tube.

5. In combination, a tube having a closed end, a differential piston assembly slidably mounted within said tube for axial movement therein for forcing by piston action a liquid within said tube toward the other end thereof, said assembly including two relatively movable telescoping piston members, one of said members having projecting means axially slidably disposed in a propellant chamber forming means of the other of same, the cross sectional area of said chamber forming means being less than the area of either of said piston members exposed to the space within said tube, liquid propellant in the space defined by said chamber forming means, and injector orifice means extending from the space defined by said chamber forming means to the space between said assembly and the closed end of said tube.

6. In combination, a tube having a closed end, a differential piston assembly slidably mounted within said tube for axial movement therein for forcing by piston action a liquid within said tube toward the other end thereof, said assembly including two relative movable interfitting piston members forming therebetween a propellant space including at least one chamber, liquid propellant in said chamber, an injector orifice extending from said chamber to the space between said assembly and the closed end of said tube, means for initially applying force to said differential piston assembly in a direction away from the closed end of said tube to effect relative inward movement of the piston members which reduces the volume of said chamber and expels propellant into said space, and means for igniting said propellant in the space between said assembly and the end of said tube to move the piston within said tube to force liquid therein toward the other end of the tube.

7. In combination, a tube having a closed end, a differential piston assembly slidably mounted within said tube for axial movement therein for forcing by piston action a liquid within said tube toward the other end thereof, said assembly including two relatively movable telescoping piston members, one of said members having projecting means axially slidably disposed in a propellant chamber forming means of the other of same, and injector orifice means extending from the space defined by said chamber forming means to the space between said assembly and the closed end of said tube.

8. A combination as defined in claim 7 wherein said chamber forming means define separate fuel and oxidizer chambers.

9. A combination as defined in claim 7 wherein the exposed end of the inner piston member faces the closed end of said tube.

10. A combination as defined in claim 7 wherein the exposed end of the inner piston faces away from the closed end of said tube.

11. A combination as defined in claim 7 wherein said differential piston assembly includes an air space defined between said piston members of greater longitudinal extent than that of said chamber.

12. In combination, a thrust chamber having an ejection nozzle, a tank for containing liquid monopropellant, a main propellant injector interconnecting said tank and said chamber, a differential piston assembly located in said fuel tank on the other side of the monopropellant from said injector, said differential piston assembly including an outer open-ended piston slidable in said fuel tank for axial movement therein for forcing the fuel in said tank toward said thrust chamber by piston action, said piston assembly containing at least one inner cavity of a predetermined cross sectional area for liquid propellant and an inner piston having one end slidable in said cavity, a secondary injector interconnecting said inner cavity and the space in said fuel tank away from said monopropellant, and means for supplying pressure to said last-mentioned space and for igniting the propellant from said inner cavity as it is sprayed into said space.

References Cited in the file of this patent
UNITED STATES PATENTS 2,789,505     Cumming et al. _____ Apr. 23, 1957